United States Patent
Ingle et al.

(10) Patent No.: US 11,401,408 B2
(45) Date of Patent: *Aug. 2, 2022

(54) POLYMER PARTICLES

(71) Applicant: HEWLETT-PACKARD DEVELOPMENT COMPANY, L.P., Spring, TX (US)

(72) Inventors: David Michael Ingle, San Diego, CA (US); Phillip C. Cagle, San Marcos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/606,988

(22) PCT Filed: Jul. 27, 2017

(86) PCT No.: PCT/US2017/044177
§ 371 (c)(1),
(2) Date: Oct. 21, 2019

(87) PCT Pub. No.: WO2019/022746
PCT Pub. Date: Jan. 31, 2019

(65) Prior Publication Data
US 2020/0392324 A1    Dec. 17, 2020

(51) Int. Cl.
| C08F 220/18 | (2006.01) |
| C08F 220/56 | (2006.01) |
| C08F 220/64 | (2006.01) |
| C08L 33/08 | (2006.01) |
| C08F 220/30 | (2006.01) |
| B41J 2/21 | (2006.01) |
| C08F 212/08 | (2006.01) |
| C08F 220/06 | (2006.01) |
| C08F 220/14 | (2006.01) |
| C09D 11/107 | (2014.01) |
| C09D 11/322 | (2014.01) |

(52) U.S. Cl.
CPC ............ *C08L 33/08* (2013.01); *B41J 2/2107* (2013.01); *C08F 212/08* (2013.01); *C08F 220/06* (2013.01); *C08F 220/14* (2013.01); *C08F 220/1804* (2020.02); *C08F 220/1806* (2020.02); *C08F 220/1811* (2020.02); *C08F 220/301* (2020.02); *C08F 220/56* (2013.01); *C09D 11/107* (2013.01); *C09D 11/322* (2013.01); *C08L 2205/02* (2013.01); *C08L 2205/22* (2013.01)

(58) Field of Classification Search
CPC ...... C08L 33/08; C08F 220/06; C08F 220/14; C08F 220/1804; C08F 220/1806; C08F 220/301; C08F 220/1811; C08F 220/56; C08F 265/06; C09D 11/107; C09D 133/26; C09D 133/12; C09D 151/003
See application file for complete search history.

(56) References Cited

U.S. PATENT DOCUMENTS

| 3,437,502 | A | 4/1969 | Warner |
| 4,186,178 | A | 1/1980 | Oberlander |
| 4,495,238 | A | 1/1985 | Adiletta |
| 4,630,076 | A | 12/1986 | Yoshimura |
| 5,990,202 | A | 11/1999 | Nguyen et al. |
| 6,184,268 | B1 | 2/2001 | Nichols et al. |
| 6,302,536 | B1 | 10/2001 | Sarma et al. |
| 6,498,202 | B1 | 12/2002 | Sun et al. |
| 6,709,095 | B2 | 3/2004 | Sago et al. |
| 6,779,884 | B1 | 8/2004 | Ma et al. |
| 6,783,580 | B2 | 8/2004 | Tyvoll et al. |
| 6,906,019 | B2 | 6/2005 | Nitzan et al. |
| 6,936,648 | B2 | 8/2005 | Bagwell et al. |
| 7,129,284 | B2 | 10/2006 | Ma et al. |

(Continued)

FOREIGN PATENT DOCUMENTS

| CN | 102190758 | 9/2011 |
| EP | 0728779 | 8/1996 |

(Continued)

OTHER PUBLICATIONS

Disperal®/Dispal® High Purity Dispersible Aluminas, Sasol reaching new frontiers, 2003, 10 pgs <http://www.sasoltechdata.com/tds/DISPERAL_DISPAL.pdf>.

(Continued)

*Primary Examiner* — Karuna P Reddy
(74) *Attorney, Agent, or Firm* — Dierker & Kavanaugh PC

(57) ABSTRACT

A polymer particle includes a first heteropolymer composition and a second heteropolymer composition having a higher glass transition temperature ($T_g$) than a $T_g$ of the first heteropolymer composition. The first heteropolymer composition includes two or more aliphatic (meth)acrylate ester monomers or two or more aliphatic (meth)acrylamide monomers. The second heteropolymer composition includes a cycloaliphatic monomer and an aromatic monomer. The cycloaliphatic monomer is selected from the group consisting of a cycloaliphatic (meth)acrylate monomer and a cycloaliphatic (meth)acrylamide monomer and the aromatic monomer is selected from the group consisting of an aromatic (meth)acrylate monomer and an aromatic (meth)acrylamide monomer.

11 Claims, 2 Drawing Sheets

(56) References Cited

U.S. PATENT DOCUMENTS

| | | |
|---|---|---|
| 7,246,896 B2 | 7/2007 | Askeland et al. |
| 7,388,040 B2 | 6/2008 | Sader et al. |
| 7,696,262 B2 | 4/2010 | Cagle et al. |
| 7,744,205 B2 | 6/2010 | Sarkisian et al. |
| 8,113,643 B2 | 2/2012 | Sarkisian et al. |
| 8,114,923 B2 | 2/2012 | Sarkisian et al. |
| 8,267,505 B2 | 9/2012 | Jolly et al. |
| 8,440,742 B2 | 5/2013 | Cagle et al. |
| 8,540,358 B2 | 9/2013 | Mozel et al. |
| 8,746,869 B2 | 6/2014 | Matsuyama et al. |
| 8,777,390 B2 | 7/2014 | Bruinsma et al. |
| 8,783,842 B2 | 7/2014 | Ingle et al. |
| 8,801,162 B2 | 8/2014 | Matsumoto et al. |
| 8,857,962 B2 | 10/2014 | Goto et al. |
| 9,062,217 B2 | 6/2015 | Gotou et al. |
| 9,133,355 B2 | 9/2015 | Brandstein et al. |
| 9,187,667 B2 | 11/2015 | Doumaux et al. |
| 9,278,515 B2 | 3/2016 | Sarkisian et al. |
| 2003/0087991 A1* | 5/2003 | Engel ............... C09D 123/08 523/201 |
| 2004/0063809 A1 | 4/2004 | Fu et al. |
| 2004/0166252 A1 | 8/2004 | Takashima et al. |
| 2005/0176847 A1 | 8/2005 | Cagle |
| 2005/0206705 A1 | 9/2005 | Ma et al. |
| 2006/0092251 A1 | 5/2006 | Prasad |
| 2007/0060670 A1 | 3/2007 | Ellis |
| 2007/0084380 A1 | 4/2007 | Cagle et al. |
| 2008/0268156 A1 | 10/2008 | Ueno et al. |
| 2009/0246377 A1 | 10/2009 | Robertson et al. |
| 2009/0295847 A1 | 12/2009 | Mukai et al. |
| 2010/0173077 A1 | 7/2010 | Ming |
| 2010/0231671 A1 | 9/2010 | Anton et al. |
| 2011/0001779 A1 | 1/2011 | Kida |
| 2011/0071249 A1 | 3/2011 | Bui et al. |
| 2011/0234689 A1 | 9/2011 | Saito |
| 2011/0303113 A1 | 12/2011 | Sarkisian et al. |
| 2011/0318551 A1 | 12/2011 | Nakagawa |
| 2012/0092413 A1 | 4/2012 | Kawamura |
| 2013/0072614 A1 | 3/2013 | Lindstrom et al. |
| 2013/0079447 A1 | 3/2013 | Koike |
| 2013/0201252 A1 | 8/2013 | Namba |
| 2013/0222503 A1 | 8/2013 | Okuda |
| 2013/0330526 A1 | 12/2013 | Song et al. |
| 2014/0141212 A1 | 5/2014 | Fu et al. |
| 2014/0204155 A1 | 7/2014 | Vanbesien |
| 2014/0220314 A1 | 8/2014 | Wu et al. |
| 2014/0220315 A1 | 8/2014 | Zhang et al. |
| 2015/0225586 A1 | 8/2015 | Ingle et al. |
| 2015/0252205 A1 | 9/2015 | Sarkisian et al. |
| 2015/0267073 A1 | 9/2015 | Zhou et al. |
| 2015/0273853 A1 | 10/2015 | Govyadinov et al. |
| 2015/0275007 A1 | 10/2015 | Cagle et al. |
| 2015/0283828 A1 | 10/2015 | Aoai et al. |
| 2015/0368488 A1 | 12/2015 | Robello et al. |
| 2016/0185124 A1 | 6/2016 | Govyadinov |
| 2016/0257154 A1 | 9/2016 | Miyamachi et al. |
| 2016/0312404 A1 | 10/2016 | Pan et al. |
| 2016/0319147 A1 | 11/2016 | Chen et al. |
| 2016/0326391 A1 | 11/2016 | Doumaux et al. |
| 2016/0333209 A1 | 11/2016 | Shimono et al. |
| 2016/0340530 A1* | 11/2016 | Horiuchi ............... C09D 11/30 |
| 2017/0335122 A1* | 11/2017 | Shimomura ......... C09D 11/107 |
| 2017/0355867 A1 | 12/2017 | Kasperchik |
| 2019/0225828 A1 | 7/2019 | Cagle et al. |

FOREIGN PATENT DOCUMENTS

| | | |
|---|---|---|
| EP | 1403341 | 3/2004 |
| EP | 1403342 | 3/2004 |
| EP | 1403346 | 3/2004 |
| EP | 1561788 | 8/2005 |
| EP | 1586454 | 10/2005 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | 2588245 | 6/2016 |
| SU | 891732 | 12/1981 |
| WO | WO-2003031191 | 4/2003 |
| WO | WO-2007112337 | 10/2007 |
| WO | WO-2009128833 | 10/2009 |
| WO | WO-2011028201 | 3/2011 |
| WO | WO-2011146069 A1 | 11/2011 |
| WO | WO-2012008978 | 1/2012 |
| WO | WO-2014042653 | 3/2014 |
| WO | WO-2015023274 | 2/2015 |
| WO | WO-2015041702 | 3/2015 |
| WO | WO-2015134020 | 9/2015 |
| WO | WO-2015142335 | 9/2015 |
| WO | WO-2016092309 | 6/2016 |
| WO | WO-2016130158 | 8/2016 |
| WO | WO-2016175738 | 11/2016 |
| WO | WO-2017009601 | 1/2017 |
| WO | WO-2017014747 | 1/2017 |
| WO | WO-2018143957 | 8/2018 |

OTHER PUBLICATIONS

TGSC Information System Bulletin for Glycereth-7, www.thegoodscentcompany.com/data/rw1300121.html, date unknown.

ChemSpider bulletin for Glycereth-3, http://www.chemspider.com/Chemical-Structure.80131.html; date unknown.

* cited by examiner

POLYMER PARTICLES

BACKGROUND

In addition to home and office usage, inkjet technology has been expanded to high-speed, commercial and industrial printing. High-speed printing applications have also expanded the type of media used in inkjet printing beyond traditional porous paper-based media. For example, non-porous flexible or rigid media are used in product packaging, signage, and other applications. Inkjet printing of aqueous inks on non-porous media is substantially different than inkjet printing on porous paper-based media. On porous paper-based media, ink drying occurs primarily by penetration of the ink into the media pore structure, and image quality is highly dependent upon the rate of ink penetration. On non-porous media, the ink does not penetrate into the media, and thus the colorant remains on the surface of the media. As such, image quality is highly dependent upon controlling ink wetting and migration across the non-porous surface.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
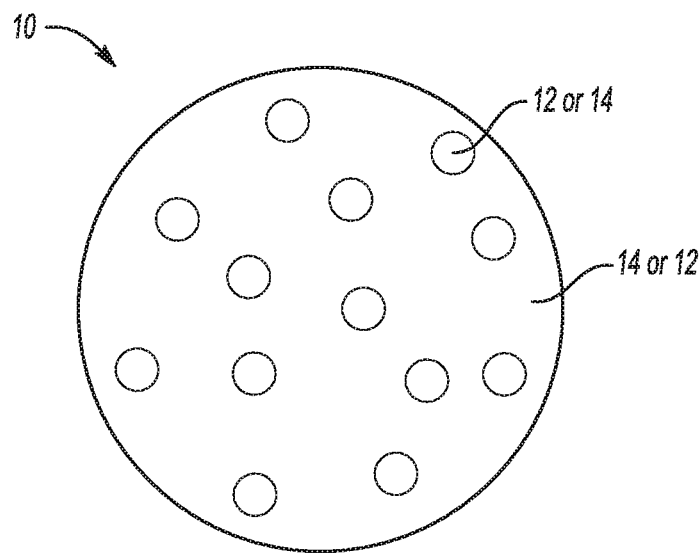
FIGS. 1A through 1C are schematic illustrations of examples of the polymer particles disclosed herein.

In the examples disclosed herein, polymer particles include multiple heteropolymer compositions within each individual particle. These heteropolymer compositions render the polymer particles suitable for use in inkjet inks that can be printed on either rigid or flexible non-porous media. One of the heteropolymer compositions may be considered a soft polymer composition, in part because it provides the polymer particle with properties that are suitable for forming printed images on flexible non-porous media. The other of the heteropolymer compositions may be considered a hard polymer composition, in part because it provides the polymer particle with properties that are suitable for forming printed images on rigid non-porous media.

As used herein, the term "flexible non-porous media" refers to a medium that can be fed from a roll without cracking, breaking, ripping, etc. In an example, the flexible non-porous media may be fed from one media roll through the printer to another media roll (e.g., a take-up roll). Examples of the flexible non-porous media include self-adhesive vinyl (SAV, which is a plasticized poly(vinyl chloride) (PVC) often used in vehicle wraps, examples of which include 3M IJ180c Controltac cast SAV, Avery MPI 1005 cast SAV, and Avery MPI 2903 calendared SAV), polyethylene terephthalate (PET), synthetic paper (also known as "plastic paper", which includes compounded polypropylene, examples of which are commercially available from Yupo Corp.), etc. The soft polymer composition in the polymer particles disclosed herein is able to adhere to flexible non-porous media. As such, a printed image formed from an ink including the polymer particles is at least substantially resistant to flaking (i.e., ink chipping off of the media, e.g., when exposing to creasing, bending, etc.). Moreover, the soft polymer composition in the polymer particles disclosed herein has enough flexibility and elasticity so that the printed image can stretch and move with the flexible non-porous media and at least substantially maintain its color (i.e., the printed image does not undergo an undesirable color change). For example, when the flexible non-porous media is elongated up to 50%, the printed image thereon experiences a minimal color change (Delta E, $\Delta E$) of less than 5 units.

Also as used herein, the term "rigid non-porous media" refers to a medium that is commonly pre-cut to a size that may then be fed through a printer or that may rest on a flat supporting structure or bed while a printing module scans across the surface while applying ink by a digital means (e.g., pen or inkjet module). Rigid media may show indications of flexibility, but generally cannot be fed from a roll without cracking, breaking, ripping, etc. Examples of the rigid non-porous media include polypropylene, acrylics, polycarbonate, coated aluminum with a polyethylene (PE) core, wood, glass, etc. Examples of polypropylene include IntePro® Fluted Polypropylene, Coroplast® Corrugated Plastic Sheets, Correx Fluted Display Board, and BiPrint® corrugated sheets. The hard polymer composition in the polymer particles disclosed herein is able to adhere to rigid non-porous media.

In the examples disclosed herein, a particular monomer may be described as constituting a certain weight percentage of the first heteropolymer composition 12 or of the second heteropolymer composition 14. This indicates that the repeating units formed from the monomer in the heteropolymer constitute the weight percentage of the heteropolymer.

Figure 1B:
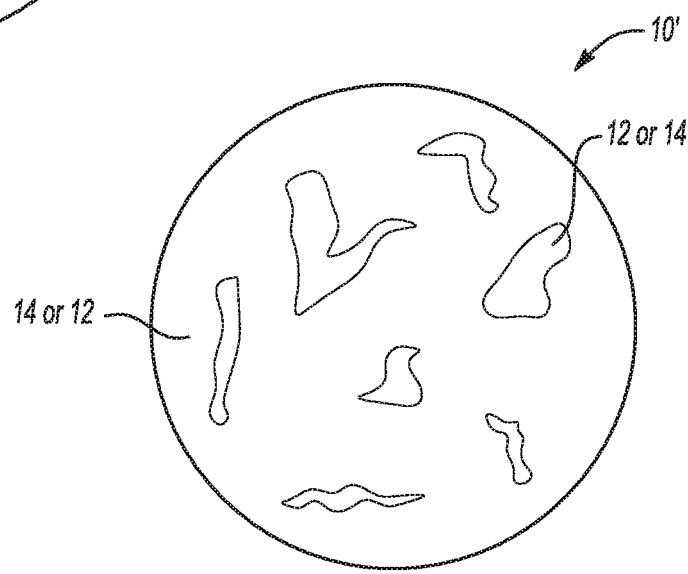
Figure 1C:
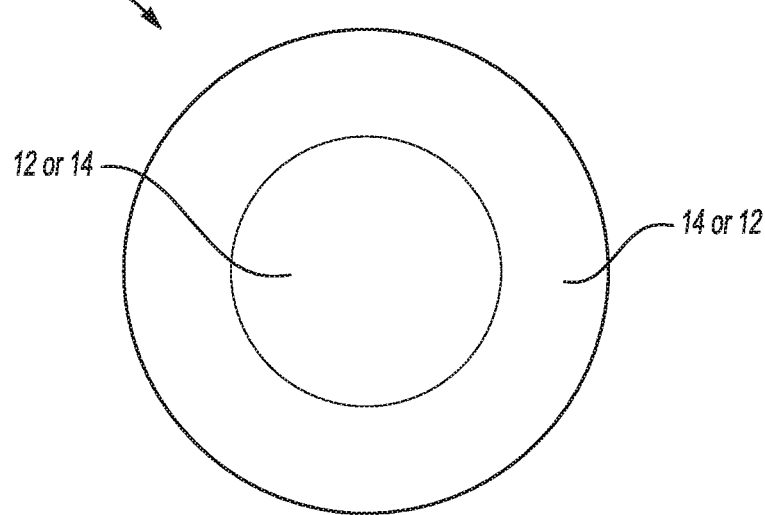

Referring now to FIGS. 1A through 1C, various examples of the polymer particle 10, 10', 10" are schematically depicted. Examples of the morphology of the polymer particles 10, 10', 10" are discussed below, but it is to be understood that the designations "12 or 14" and "14 or 12" indicate that when the first heteropolymer composition 12 makes up one phase, the second heteropolymer composition 14 makes up the other phase. As such, in FIG. 1A, the composition 12 may form the phase that is surrounded by the composition 14, or the composition 14 may form the phase that is surrounded by the composition 12. Moreover, while a few example morphologies are schematically illustrated, the two compositions 12, 14 may reside together in any physically separated configuration.

The polymer particle 10, 10', 10" disclosed herein includes a first heteropolymer composition 12 including two or more aliphatic (meth)acrylate ester monomers or two or more aliphatic (meth)acrylamide monomers; and a second heteropolymer composition 14 having a higher glass transition temperature ($T_g$) than a $T_g$ of the first heteropolymer composition 12, the second heteropolymer composition 14 including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer. The first heteropolymer composition 12 may be considered the soft polymer composition and the second heteropolymers composition 14 may be considered the hard polymer composition.

It has been found that the amount of the first heteropolymer composition 12 within the polymer particles 10, 10', 10'' impacts the ability of the ink (which includes the polymer particles 10, 10', 10'') to adequately adhere to both rigid and flexible substrates. Additionally, it has been found that while a lower percentage (e.g., less than 15 wt %) of the first heteropolymer composition 12 may improve color maintenance during stretching, this percentage does not reduce flaking. As such, in the examples disclosed herein, the first heteropolymer composition 12 is present in an amount ranging from about 15 wt % to about 70 wt % of a total weight of the polymer particle 10, 10', 10''; and the second heteropolymer composition 14 is present in an amount ranging from about 30 wt % to about 85 wt % of the total weight of the polymer particle 10, 10', 10''. In other examples, the first heteropolymer composition 12 is present in an amount ranging from about 30 wt % to about 40 wt % of a total weight of the polymer particle 10, 10', 10''; and the second heteropolymer composition 14 is present in an amount ranging from about 60 wt % to about 70 wt % of the total weight of the polymer particle 10, 10', 10''. In one specific example, the first heteropolymer composition 12 is present in an amount of about 35 wt % of a total weight of the polymer particle 10, 10', 10''; and the second heteropolymer composition 14 is present in an amount of about 65 wt % of the total weight of the polymer particle 10, 10', 10''.

The first heteropolymer composition 12 includes two or more aliphatic (meth)acrylate ester monomers or two or more aliphatic (meth)acrylamide monomers. The term "(meth)acrylate" refers to both acrylates and methacrylates. For example, "ethyl (meth)acrylate" refers to ethyl acrylate and/or ethyl methacrylate. The term "(meth)acrylamide" refers to both acrylamides and methacrylamides. For example, the term "methyl (meth)acrylamide" denotes methyl acrylamide and/or methyl methacrylamide.

In an example, the two or more aliphatic (meth)acrylate ester monomers are linear aliphatic (meth)acrylate ester monomers, cycloaliphatic (meth)acrylate ester monomers, or combinations thereof; or the two or more aliphatic (meth)acrylamide monomers are selected from the group consisting of C1 to C8 alkyl acrylamide monomers and C1 to C8 alkyl methacrylamide monomers.

As previously mentioned, the aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers are selected from the group consisting of ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers are selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Examples of some specific monomer combinations used to form the first heteropolymer composition 12 include methyl methacrylate, butyl acrylate, and methacrylic acid or butyl methacrylate, butyl acrylate, and methacrylic acid. In these examples, the composition 12 may include the (meth)acrylates in an amount ranging from about 85 wt % to about 99 wt % and the (meth)acrylic acid in an amount ranging from about 1 wt % to about 15 wt %, where these weight percentages are based on the total weight solids of the composition 12.

The type and amount of each of the two or more monomer units that are polymerized to form the first heteropolymer composition 12 are selected so that the $T_g$ of the first heteropolymer composition 12 ranges from about −25° C. to about 10° C. The $T_g$ of the first heteropolymer composition 12 and the $T_g$ of the second heteropolymer composition 14 may be defined in relation to each other, and the $T_g$ of the first heteropolymer composition 12 is generally lower than the $T_g$ of the second heteropolymer composition 14.

The second heteropolymer composition 14 includes the cycloaliphatic monomer and the aromatic monomer.

The cycloaliphatic monomer may be a cycloaliphatic (meth)acrylate monomer or a cycloaliphatic (meth)acrylamide monomer. In some examples, the cycloaliphatic (meth)acrylate or (meth)acrylamide monomer is a cycloaliphatic monomer having the formula (I):

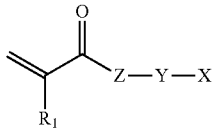

formula (I)

wherein: $R_1$ is H or methyl; Z is O (i.e., the monomer is an acrylate) or $NR_2$ (i.e., the monomer is an acrylamide) where $R_2$ is H, an alkyl or X'; Y is a bond or a carbon chain, where one or more of the carbon atoms of the carbon chain may be replaced with a heteroatom such as oxygen, sulfur, or nitrogen; and X and X' are independently cycloaliphatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or X'. Yet further $R_2$ may be H or X'. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (i.e., a C5 to C12 ring), or a 5-12 membered heteroaliphatic ring. In some examples, X is a C5 to C12 single ring (such as cyclopentyl, cyclohexyl or cycloheptyl groups) or a bicyclic ring (such as decalin). As some specific examples, X may be a carbon ring having 5-10 carbon atoms or a carbon ring having 6-10 carbon atoms. X may also be substituted, for example, with an alkyl, alkoxy, hydroxyl, heteroalkyl, aryl, cycloaliphatic, or aromatic substituent. In some examples, X is substituted with an alkyl group (for example, a C1 to C12 alkyl group), or an aryl group (for example, a C5 to C12 aryl group), or with a heteroalkyl group (for example, a C1 to C12 heteroalkyl group).

X' is a carbon ring having 5-12 carbon atoms (i.e., a C5 to C12 ring), or a 5-12 membered heteroaliphatic ring. In some examples, X' is a C5 to C12 single ring (such as cyclopentyl, cyclohexyl or cycloheptyl groups) or a bicyclic ring (e.g., two C6 fused rings, i.e., a C10 ring, such as decalin). As specific examples, X' may be a carbon ring having 5-10 carbon atoms or a carbon ring having 6-10 carbon atoms. X' may also be substituted, for example, with an alkyl, alkoxy, hydroxyl, heteroalkyl, cycloaliphatic or aromatic substituent. In some examples, X' is substituted with an alkyl group (for example a C1 to C12 alkyl group), a C5 to C12 aryl group, a C1 to C12 heteroalkyl group.

In some examples when Z is $NR_2$ and $R_2$ is X', then X and X' may be the same.

Some specific examples of the cycloaliphatic monomer include cyclohexyl acrylate ($R_1$ is H, Z is O, Y is a bond, and X is a 6 membered ring), cyclohexyl methacrylate ($R_1$ is methyl ($CH_3$), Z is O, Y is a bond, and X is a 6 membered ring), methylcyclohexyl acrylate ($R_1$ is H, Z is O, Y is a bond, and X is a methyl-substituted 6 membered ring), methylcyclohexyl methacrylate ($R_1$ is methyl ($CH_3$), Z is O, Y is a bond, and X is a 1-methyl-substituted 6 membered ring), trimethylcyclohexyl acrylate ($R_1$ is H, Z is O, Y is a bond, and X is a 3,3,5-methyl-substituted 6 membered ring), trimethylcyclohexyl methacrylate ($R_1$ is methyl ($CH_3$), Z is O, Y is a bond, and X is a 3,3,5-methyl-substituted 6 membered ring), and combinations thereof.

The aromatic monomer may be an aromatic (meth)acrylate monomer or an aromatic (meth)acrylamide monomer. In some example, the aromatic (meth)acrylate or (meth)acrylamide monomer is an aromatic monomer having the formula (II):

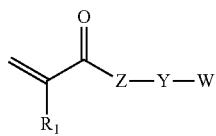

formula (II)

wherein: $R_1$ is H or methyl; Z is O (i.e., the monomer is an acrylate) or $NR_2$ (i.e., the monomer is an acrylamide) where $R_2$ is H, an alkyl or W'; Y is a bond or a carbon chain, where one or more of the carbon atoms of the carbon chain may be replaced with a heteroatom such as oxygen, sulfur, or nitrogen; and W and W are independently aromatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or W. Yet further $R_2$ may be H or W. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring. As examples, W may be a carbon ring having 6-12 carbon atoms (i.e., a C6 to C12 aromatic ring), or a 5-12 membered heteroaromatic ring. In some examples, W is a C5 to C12 aromatic ring, and the C5 to C12 aromatic ring may be a single aromatic ring (e.g., benzyl or phenyl) or a bicyclic aromatic ring (e.g., two C6 fused aromatic rings, i.e., a C10 aromatic ring, e.g., naphthyl). As some specific examples, W may be an aromatic carbon ring having 5-10 carbon atoms or an aromatic carbon ring having 6-10 carbon atoms. W may also be substituted, for example, with an alkyl, aryl, or heteroalkyl substituent. In some examples, W is substituted with an alkyl group (for example, a C1 to C12 alkyl group), or an aryl group (for example, a C5 to C12 aryl group), or a heteroalkyl group (for example, a C1 to C12 heteroalkyl group).

W' is an aromatic carbon ring having 5-12 carbon atoms (i.e., a C5 to C12 aromatic ring, or a 5-12 membered heteroaromatic ring.

In some examples, W' is a C6 to C12 single aromatic ring (e.g., benzyl or phenyl), or a bicyclic ring (e.g., two C6 fused aromatic rings, i.e., a C10 aromatic ring, e.g., naphthyl). As specific examples, W' may be an aromatic ring having 5-10 carbon atoms or having 6-10 carbon atoms. W' may also be substituted, for example, with an alkyl group, an aryl group, or a heteroalkyl group.

In some examples when Z is $NR_2$ and $R_2$ is W', then W and W' may be the same.

Some specific examples of the aromatic monomer include 2-phenoxyethyl methacrylate ($R_1$ is methyl ($CH_3$), Z is O, Y is —$CH_2$—$CH_2$—O—, and W is a 6 membered aromatic ring), 2-phenoxyethyl acrylate ($R_1$ is H, Z is O, Y is —$CH_2$—$CH_2$—O—, and W is a 6 membered aromatic ring), phenyl propyl methacrylate ($R_1$ is methyl ($CH_3$), Z is O, Y is —$(CH_2)_3$—, and W is a 6 membered aromatic ring), phenyl propyl acrylate ($R_1$ is H, Z is O, Y is —$(CH_2)_3$—, and W is a 6 membered aromatic ring), benzyl methacrylate ($R_1$ is methyl ($CH_3$), Z is O, Y is —$CH_2$—, and W is a 6 membered aromatic ring), benzyl acrylate ($R_1$ is H, Z is O, Y is —$CH_2$—, and W is a 6 membered aromatic ring), phenylethyl methacrylate ($R_1$ is methyl ($CH_3$), Z is O, Y is —$(CH_2)_2$—, and W is a 6 membered aromatic ring), phenylethyl acrylate ($R_1$ is H, Z is O, Y is —$(CH_2)_2$—, and W is a 6 membered aromatic ring), benzhydryl methacrylate ($R_1$ is methyl ($CH_3$), Z is O, Y is —CH—, and W includes two 6 membered aromatic rings), benzhydryl acrylate ($R_1$ is H, Z is O, Y is —CH—, and W includes two 6 membered aromatic rings), 2-hydroxy-3-phenoxypropyl acrylate ($R_1$ is H, Z is O, Y is —$CH_2$—CHOH—$CH_2$—O, and W is a 6 membered aromatic ring), 2-hydroxy-3-phenoxypropyl methacrylate ($R_1$ is methyl ($CH_3$), Z is O, Y is —$CH_2$—CHOH—$CH_2$—O, and W is a 6 membered aromatic ring), N-benzyl methacrylamide ($R_1$ is methyl ($CH_3$), Z is NH, Y is —$CH_2$—, and W is a 6 membered aromatic ring), N-benzyl acrylamide ($R_1$ is H, Z is NH, Y is —$CH_2$—, and W is a 6 membered aromatic ring), N,N-diphenyl methacrylamide ($R_1$ is methyl ($CH_3$), Z is NW', where W' is a 6 membered aromatic ring, Y is a bond, and W is a 6 membered aromatic ring), N,N-diphenyl acrylamide ($R_1$ is H, Z is NW', where W' is a 6 membered aromatic ring, Y is a bond, and W is a 6 membered aromatic ring), naphthyl methacrylate ($R_1$ is methyl ($CH_3$), Z is O, Y is a bond, and W is naphthyl), naphthyl acrylate ($R_1$ is H, Z is O, Y is a bond, and W is naphthyl), phenyl methacrylate ($R_1$ is methyl ($CH_3$), Z is O, Y is a bond, and W is a 6 membered aromatic ring), phenyl acrylate ($R_1$ is H, Z is O, Y is a bond, and W is a 6 membered aromatic ring), and combinations thereof.

In an example of the second heteropolymer composition 14, the cycloaliphatic monomer is selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof; and the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

In some examples, the second heteropolymer composition 14 includes the cycloaliphatic monomer, the aromatic monomer, and an additional monomer selected from the group consisting of an unsaturated acid functional acrylate derivative, butyl acrylate, butyl methacrylate, and methyl methacrylate. Examples of the unsaturated acid functional acrylate derivative include methacrylic acid, acrylic acid, 2-sulfoethyl methacrylate, etc.

The composition 14 may include the cycloaliphatic monomer(s) in an amount ranging from about 60 wt % to about 90 wt %, the aromatic monomer(s) in an amount ranging from about 1 wt % to about 30 wt %, and when included, the additional monomer(s) in an amount ranging from about 0.1 wt % to about 10 wt %, where these weight percentages are based on the total weight solids of the composition 14. An example of a specific monomer combination used to form the second heteropolymer composition 14 includes cyclohexyl methacrylate, cyclohexyl acrylate, 2-phenoxyethyl methacrylate, and methacrylic acid. Another example of a specific monomer combination used to form the second heteropolymer composition 14 includes cyclohexyl methacrylate, cyclohexyl acrylate, 2-phenoxyethyl methacrylate, methacrylic acid and methyl methacrylate and/or butyl acrylate. In these examples, the composition 14 may include the cycloaliphatic monomer(s) in an amount ranging from about 74 wt % to about 90 wt %, the aromatic monomer(s) in an amount ranging from about 1 wt % to about 20 wt %, and when included, the additional monomer(s) in an amount ranging from about 0.5 wt % to about 6 wt %, where these weight percentages are based on the total weight solids of the composition 14.

The type and amount of each of the cycloaliphatic monomer and the aromatic monomer that are polymerized to form the second heteropolymer composition 14 are selected so that the $T_g$ of the second heteropolymer composition 14 ranges from about 60° C. to about 110° C. The $T_g$ of the first heteropolymer composition 12 is higher than the $T_g$ of the second heteropolymer composition 14.

In an example of the polymer particle 10, 10', 10", the $T_g$ of the first heteropolymer composition 12 ranges from about −25° C. to about 10° C.; the $T_g$ of the second heteropolymer composition 14 ranges from about 60° C. to about 110° C.; and a $T_g$ of the polymer particle 10, 10', 10" ranges from about 25° C. to about 65° C. The glass transition temperature $T_g$ of the polymer particle 10, 10', 10" may be estimated using the Fox equation (T. G. Fox, Bull. Am. Physics Soc., Volume 1, Issue No. 3, page 123 (1956)) using the $T_g$ of the heteropolymer compositions 12, 14 forming the polymer particle 10, 10', 10". The maximum $T_g$ of each of the heteropolymers compositions 12, 14 may be taken from literature values (for example as listed in "Polymer Handbook", edited by J. Brandrup, E. H. Immergut, and E. A. Grulke, Wiley Publishers, $4^{th}$ edition). The glass transition temperature of the 10, 10', 10" may also be determined using DSC (differential scanning calorimetry) according to ASTM D3418. Using AS™ D3418 may be less desirable, in part because this method for determining $T_g$ may be biased, as it takes into account other parameters, such as molecular weight, plasticization of the higher $T_g$ polymer by the lower $T_g$ polymer to form an intermediate $T_g$ mixture, and heating history of the actual DSC sample to determine the $T_g$. The individual amounts of the first heteropolymer composition 12 and the second heteropolymer composition 14 may be adjusted in accordance with the ranges provided herein in order to achieve the desired $T_g$ of the polymer particle 10, 10', 10".

In one specific example of the polymer particle 10, 10', 10", the first heteropolymer composition 12 includes butyl acrylate, methyl methacrylate and methacrylic acid as the two or more aliphatic (meth)acrylate ester monomers; and the second heteropolymer composition 14 includes cyclohexyl methacrylate and cyclohexyl acrylate as the cycloaliphatic monomers, 2-phenoxyethyl methacrylate as the aromatic monomer, and methacrylic acid as an additional monomer. In this specific example of the polymer particle 10, 10', 10", the $T_g$ of the first heteropolymer composition 12 ranges from about −8° C. to about −9° C.; the $T_g$ of the second heteropolymer composition 14 ranges from about 85° C. to about 88° C.; and the polymer particle includes about 35 wt % of the first heteropolymer composition and about 65 wt % of the second heteropolymer composition.

In some examples, the polymer particle 10, 10', 10" substantially lacks a styrene component. For example, the polymer particle 10, 10', 10" may include no more than 5% styrene (where the percentage is with respect to the total weight of the polymer particle 10, 10', 10"). In other example, the styrene (e.g., a styrene monomer) may be present in an amount of 4 wt % or less, 3 wt % or less, 2 wt % or less, 1 wt % or less, 0.5 wt % or less, or 0.1 wt % or less. In some examples, the latex polymer lacks a styrene component.

FIGS. 1A through 1C schematically illustrate different morphologies of the polymer particles 10, 10', 10". For any of the morphologies, the first heteropolymer composition 12 is physically separated from the second heteropolymer composition 14 within the polymer particle 10, 10', 10". The physical separation of the compositions 12, 14 may manifest itself in a number of different ways. The first heteropolymer composition 12 may be interdispersed and incompletely coalesced among the second heteropolymer composition 14, as shown in FIGS. 1A and 1B. In FIG. 1A, the first heteropolymer composition 12 forms substantially uniform spheres distributed throughout the second heteropolymer composition 14. In FIG. 1B, the first heteropolymer composition 12 forms randomly shaped strands distributed throughout the second heteropolymer composition 14. In addition to the examples shown in FIGS. 1A and 1B, it is to be understood that any interdispersed and/or incompletely coalesced arrangement of the compositions 12, 14 is contemplated as being suitable for the polymer particle 10, 10', 10" morphology. Alternatively, the first heteropolymer composition 12 may form a core that is located within a continuous or discontinuous shell formed of the second heteropolymer composition 14. Still further, the second heteropolymer composition 14 may form a core that is located within a continuous or discontinuous shell formed of the first heteropolymer composition 12. While not shown, some examples of other possible morphologies include the compositions 12, 14 separated into hemispheres, or one of the compositions 12 or 14 present as small nodes at the surface of a sphere of the other of the compositions 14 or 12. As previously mentioned, the morphologies described (whether shown or not shown) are not intended to limit the various physical separations of the compositions 12, 14 that are possible. As such, any physical separation of the compositions 12, 14 within the polymer particles is possible.

In an example, the polymer particle 10, 10', 10" may be formed using multiple streams (e.g., monomer streams) in a reactor. Prior to the addition of any stream, water and a polymerization seed may be added to the reactor. In an example, the polymerization seed is a vinyl polymer, although other seeds may be used. A seed may be a small, pre-formed heteropolymer particle (e.g., formed by a separate emulsion polymerization or other polymerization process) that replaces early particle formation stages by becoming the locus of polymerization. The seed particle(s) grow through additional polymerization in and/or on the seed, and there may be a one to one relationship of the number of seeds to the number of final polymer particles 10, 10', 10". The use of polymer seeds permits accurate and reproducible particle size control. An initiator may also be added to or included with the water and heteropolymer seed. Examples of suitable initiators include persulfate, such as a metal persulfate or an ammonium persulfate. In some examples, the initiator may be selected from a sodium persulfate, ammonium persulfate, or potassium persulfate. It is to be understood that the initiator dissolved in water may also be added to the reactor throughout the reaction process.

In an example, two streams are concurrently added to the reactor. One of the two steams is a monomer stream including the two or more aliphatic (meth)acrylate ester monomers or two or more aliphatic (meth)acrylamide monomers used to form the first heteropolymer composition 12. In this example, the monomers may be present in an oil-in-water pre-emulsion. Another of the two streams includes an aqueous solution of a copolymerizable surfactant (e.g., surfactants from the HITENOL® AR series or the HITENOL® KH series or the HITENOL® BC series, e.g. HITENOL® AR-10, AR-20, KH-05, KH-10, BC-10, or BC-30). While several examples of surfactants have been provided, it is to be understood that another copolymerizable surfactant may be used, or a non-polymerizable surfactant may be used. These streams may be added over a targeted feed time, and may be allowed to react at a predetermined temperature for a predetermined time. In an example, the targeted feed time is about 105 minutes, the predetermined temperature is about 77° C., and the predetermined time is about 1 hour. While one example has been given, it is to be understood that other feed times, temperatures, and reaction times may be used.

In another example, these two streams (i.e., the monomer stream and the aqueous surfactant stream) may be combined into an oil-in-water pre-emulsion, and the pre-emulsion may be fed into the reactor as a single stream over the course of the reaction feed time.

In still other examples, the two or more aliphatic (meth)acrylate ester monomers or two or more aliphatic (meth)acrylamide monomers could be separated into separate monomer feed streams (e.g., a first aliphatic (meth)acrylate ester monomer and a second aliphatic (meth)acrylate ester monomer). Each of the monomer streams may be paired with a separate aqueous surfactant stream. In this example, each pair (i.e., one of the monomer streams and one of the aqueous surfactant streams) could be fed into the reactor at a particular time (e.g., the first pair of streams followed by the second pair of streams). Alternatively, in this example, each pair could be combined into its own pre-emulsion, and the pre-emulsions may be fed into the reactor sequentially (i.e., one before the other).

In any of the previously described examples (e.g., two streams, a pre-emulsion stream, etc.), another monomer stream is then introduced. This other monomer stream may be an aqueous emulsion including the cycloaliphatic monomer and the aromatic monomer, and in some instances, the additional monomer, used to form the second heteropolymer composition 14. In addition to water and the various monomers, the other monomer stream may also include a copolymerizable surfactant. The other stream may be added over a targeted feed time, and may be allowed to react at a predetermined temperature for a predetermined time. In an example, the targeted feed time is about 195 minutes, the predetermined temperature is about 85° C., and the predetermined time is about 1 hour. While one example has been given, it is to be understood that other feed times, temperatures, and reaction times may be used.

The temperature may vary depending, in part, on the initiator used. For persulfate initiated polymerizations of 5 to 6 hours time, the half-life of the polymerization needs to be taken into account. The reaction temperature determines, in part, the persulfate half-life. In an example involving a persulfate initiator, the reaction temperature ranges from about 68° C. to about 80° C. In another example, the reaction temperature is 70° C.+/−2°.

The overall feed time may be longer or shorter, as desired in order to form the polymer particles 10, 10', 10". In some examples, the feed time may be proportional to the percentage of the compositions 12, 14. For example, with a 5 hour feed time and a target composition for the polymer particle 10, 10', 10" including about 35 wt % of the first heteropolymer composition 12 and about 65 wt % of the second heteropolymer composition 14, the monomers for the first heteropolymer composition 12 may be fed for 35% of the 5 hour period (about 105 minutes) and the monomers for the second heteropolymer composition 14 may be fed for 65% of the 5 hour period (about 195 minutes). It is to be understood that other feed times may be used that are unrelated to the percentage of the compositions 12, 14 in the polymer particles 10, 10', 10".

The reaction product includes the polymer particles 10, 10', 10" in an aqueous emulsion. As such, the polymer particles 10, 10', 10" may be referred to as latex particles. The particle size of the polymer particles 10, 10', 10" may range from about 0.06 μm (about 60 nm) to about 0.4 μm (about 400 nm). In another example, the particle size of the polymer particles 10, 10', 10" may range from about 0.1 μm to about 0.3 μm.

In an example, the aqueous emulsion (the polymer particles 10, 10', 10") may include from about 40% solids to about 50% solids, based on the total weight of the aqueous emulsion. The viscosity of the aqueous emulsion (the polymer particles 10, 10', 10") may be less than 50 cps, or less than 20 cps (when measured at 25° C. and 50 rpm with a Brookfield viscometer).

The polymer particles 10, 10', 10" disclosed herein may be used in an inkjet ink composition that is able to be printed on both flexible non-porous substrates and rigid non-porous substrates. In an example, the inkjet ink composition includes an ink vehicle including water and a co-solvent; a pigment dispersed in the ink vehicle; and polymer particles 10, 10', 10" dispersed in the ink vehicle, each of the polymer particles 10, 10', 10" including a first heteropolymer composition 12 including two or more aliphatic (meth)acrylate ester monomers or two or more aliphatic (meth)acrylamide monomers; and a second heteropolymer composition 14 having a higher glass transition temperature ($T_g$) than a $T_g$ of the first heteropolymer composition 12, the second heteropolymer composition 14 including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer.

The ink vehicle may be a water-based vehicle (i.e., water is the main vehicle component, 50 wt % or higher) when the inkjet ink composition is for thermal inkjet printing, and may be a solvent-based vehicle (i.e., a solvent or a mixture of co-solvents is the main vehicle component, 50 wt % or higher) when the inkjet ink composition is for piezoelectric inkjet printing.

In some examples, the inkjet ink composition includes water in an amount of at least about 20 wt %, for example, at least about 30 wt %, or at least about 40 wt %, or at least about 50 wt %, by total weight of the inkjet ink composition. In some examples, the inkjet ink composition includes up to about 80 wt % water, for example up to about 75 wt %, up to about 60 wt %, or up to about 55 wt %, by total weight of the inkjet ink composition. In some examples, the inkjet ink composition includes water in an amount ranging from about 20 wt % to about 85 wt % by total weight of the inkjet ink composition.

The inkjet ink composition also includes a co-solvent or a blend of co-solvents. In some examples, the inkjet ink composition includes the co-solvent(s) in an amount of at least about 1 wt %, for example at least about 5 wt %, or at least about 10 wt %, by total weight of the inkjet ink composition. In some examples, the inkjet ink composition includes the co-solvent(s) in an amount up to about 50 wt %, for example up to about 40 wt %, or up to about 35 wt % by total weight of the inkjet ink composition. In some examples, the inkjet ink composition includes the co-solvent (s) in an amount ranging from about 1 wt % to about 50 wt % by total weight of the composition.

In some examples, the co-solvent is a blend including a solvent having a boiling point ranging from about 170° C. to about 215° C. and a solvent having a boiling point of about 220° C. or more. The solvent having a boiling point ranging from about 170° C. to about 215° C. may itself be a blend of solvents, where each solvent of the blend has a boiling point ranging about 170° C. to about 215° C. The solvent having a boiling point of about 220° C. or more may also be a blend of solvents, where each solvent of the blend of solvents has a boiling point of about 220° C. or more. When the blend including a solvent having a boiling point ranging from about 170° C. to about 215° C. and a solvent having a boiling point of about 220° C. or more is used, the inkjet ink composition may include from about 10 wt % to about 40 wt % by total weight of the inkjet ink composition of the solvent having the boiling point in the range of about 170° C. to about 215° C. and from about 0.1 wt % to about 8 wt % by total weight of the inkjet ink composition of the solvent having the boiling point of about 220° C. or more.

In some other examples, the co-solvent is a blend including any two or more of a solvent having a boiling point ranging from about 170° C. to about 215° C., a solvent having a boiling point of ranging from about 220° C. to about 285° C., and a solvent having a boiling point greater than about 285° C. and/or being insoluble in water. In these example, the inkjet ink composition may include from about 10 wt % to about 40 wt % by total weight of the inkjet ink composition of the solvent having the boiling point in the range of about 170° C. to about 215° C., and/or from about 0.5 wt % to about 8 wt % of the solvent having the boiling point in the range of about 220° C. to about 285° C., and/or from about 0.1 wt % to about 4 wt % of the solvent having the boiling point of greater than about 285° C. and/or being insoluble in water. As one example, the co-solvent may include the solvent having a boiling point ranging from about 170° C. to about 215° C. and the solvent having the boiling point ranging from about 220° C. to about 285° C. As another example, the co-solvent may include the solvent having a boiling point ranging from about 170° C. to about 215° C. and the solvent having a boiling point of greater than about 285° C. and/or being insoluble in water. As still another example, the co-solvent may include the solvent having a boiling point ranging from about 170° C. to about 215° C., and the solvent having a boiling point ranging from about 220° C. to about 285° C., and the solvent having a boiling point of greater than about 285° C. and/or being insoluble in water.

Some examples of the ink vehicle include the solvent having a boiling point ranging from about 170° C. to about 215° C. In an example, this solvent has a boiling point ranging from about 180° C. to about 215° C. In some examples, this solvent is selected from an aliphatic alcohol, for example a primary aliphatic alcohol, a secondary aliphatic alcohol, or a tertiary aliphatic alcohol. The aliphatic alcohol may be a diol. In some examples, this solvent is an aliphatic alcohol (specifically a diol) containing 10 carbons or less, for example 8 carbons or less, or 6 carbons or less.

Specific examples of the solvent having a boiling point ranging from about 170° C. to about 215° C. may be selected from the group consisting of 1,2-propanediol, 1,2-butanediol, ethylene glycol, 2-methyl-2,4-pentanediol, 1,3-butanediol, 2-methyl-1,3-propanediol, 1,3-propanediol, and combinations thereof. In some examples the solvent having a boiling point ranging from about 170° C. to about 215° C. is selected from the group consisting of 1,2-propanediol, 1,2-butanediol, ethylene glycol, 2-methyl-2,4-pentanediol, 1,3-butanediol, and combinations thereof. In some other examples the first solvent is 1,2-butanediol. The boiling points of 1,2-propanediol, 1,2-butanediol, ethylene glycol, 2-methyl-2,4-pentanediol, 1,3-butanediol, 2-methyl-1,3-propanediol and 1,3-propanediol are listed in Table 1 below.

TABLE 1

| Solvent | Boiling point (° C.) |
| --- | --- |
| propylene glycol (1,2-propanediol) | 188 |
| 1,2-butanediol | 194 |
| ethylene glycol | 196 |
| 2-methyl-2,4-pentanediol (hexylene glycol) | 198 |
| 1,3-butanediol | 203 |
| 2-methyl-1,3-propanediol (MPdiol) | 213 |
| 1,3-propanediol | 214 |

In some examples, the inkjet ink composition includes at least about 5 wt % (by total weight of the inkjet ink composition) of the solvent having a boiling point ranging from about 170° C. to about 215° C. In some examples, the inkjet ink composition includes up to about 40 wt % (by total weight of the inkjet ink composition) of the solvent having a boiling point ranging from about 170° C. to about 215° C.

Some examples of the ink vehicle include the solvent having a boiling point of about 220° C. or more. In some instance, this solvent may be defined having a boiling point ranging from about 220° C. to about 285° C. In other instances, this solvent may be defined as having a boiling point of greater than about 285° C. and/or as being insoluble in water. In still other examples, this solvent may include a blend of the solvent having a boiling point ranging from about 220° C. to about 285° C. and the solvent having a boiling point of greater than about 285° C. and/or being insoluble in water.

The solvent having the boiling point ranging from about 220° C. to about 285° C. may be selected from alcohols (including aliphatic alcohols and aromatic alcohols), esters, glycol ethers, di- and tri-alkylene glycols, amides, lactams and sulfones. In some examples, this solvent is selected from aliphatic alcohols (including primary, secondary and tertiary aliphatic alcohols, including diols), aromatic alcohols, esters, alkylene glycol alkyl ethers (including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone), and sulfones (such as sulfolane or other cyclic sulfones). In some examples, the aliphatic alcohols, esters, glycol alkyl ethers, and glycol aryl ethers may have 20 carbon atoms or less (e.g., 12 carbons or less, 10 carbons or less, etc.).

Specific examples of the solvent having the boiling point ranging from about 220° C. to about 285° C. may be selected from the group consisting of ethylene glycol 2-ethylhexyl ether, dipropylene glycol n-butyl ether, diethylene glycol n-butyl ether, propylene glycol phenyl ether, 2-pyrrolidinone, tripropylene glycol methyl ether, 2,2,4-trimethyl-1,3-pentanediol monoisobutyrate, tripropylene glycol n-propyl ether, tripropylene glycol n-butyl ether, tetraethylene glycol dimethyl ether, and dipropylene glycol phenyl ether. In some examples, the solvent having the boiling point ranging from about 220° C. to about 285° C. may be selected from the group consisting of 2-pyrrolidinone, tripropylene glycol methyl ether, and tripropylene glycol n-butyl ether.

The boiling points of some examples of the solvent having the boiling point ranging from about 220° C. to about 285° C. are listed in Table 2 below.

TABLE 2

| Solvent | Boiling point (° C.) |
| --- | --- |
| ethylene glycol 2-ethylhexyl ether (Eastman EEH) | 229 |
| dipropylene glycol n-butyl ether (DOWANOL ™ DPnB) | 230 |
| diethylene glycol n-butyl ether (Butyl Carbitol) | 230 |
| propylene glycol phenyl ether (DOWANOL ™ PPh) | 243 |
| 2-pyrrolidinone | 245 |
| tripropylene glycol methyl ether (DOWANOL ™ TPM) | 245 |
| 2,2,4-trimethyl-1,3-pentanediol monoisobutyrate (TEXANOL ™) | 255-261.5 |
| tripropylene glycol n-propyl ether | 261 |
| tripropylene glycol n-butyl ether (DOWANOL ™ TPnB) | 274 |
| tetraethylene glycol dimethyl ether (tetraglyme) | 275 |
| dipropylene glycol phenyl ether (DOWANOL ™ DiPPh) | 280 |

In some examples, the inkjet ink composition includes at least about 0.1 wt % (by total weight of the inkjet ink composition) of the solvent having a boiling point ranging from about 220° C. to about 285° C. In some examples, the inkjet ink composition includes up to about 8 wt % (by total weight of the inkjet ink composition) of the solvent having a boiling point ranging from about 220° C. to about 285° C.

The inkjet ink composition disclosed herein may also include the solvent having a boiling point of greater than about 285° C. and/or being insoluble in water. This solvent may remain in an ink layer printed on a non-porous flexible or rigid media after the inkjet ink composition has been cured. In the examples disclosed herein, curing may remove at least a portion of the water, the solvent having a boiling point ranging from about 170° C. to about 215° C., and the solvent having a boiling point ranging from about 220° C. to about 285° C.

When the solvent having a boiling point of greater than about 285° C. is used, it may be water soluble (i.e., having a solubility of greater than about 10% in water). In some examples, the solubility of the water soluble solvent having a boiling point of greater than about 285° C. may be greater than about 90%. The water soluble solvent having a boiling point of greater than about 285° C. may be present in the inkjet ink composition in an amount ranging from about 0.1 wt % to about 4 wt % by total weight of the inkjet ink composition.

Alternatively, the solvent having a boiling point of greater than about 285° C. may be water insoluble. In still other examples, instead of a water soluble or insoluble solvent having a boiling point of greater than about 285° C., a water insoluble solvent having a lower boiling point may be included. The term "insoluble," as used herein, refers to a solvent having a water solubility of less than about 10%, for example less than about 5%, less than about 4.5%, or less than about 4%. In some examples, it may be desirable that the water insoluble solvent having a water solubility of at least 1%. The solubility of the solvent in water may be determined as the amount of solvent by weight which may be dissolved in 100 g of water (under conditions of standard temperature and pressure) to produce a saturated solution. The solubility of the solvent in water may alternatively be determined by referring to data provided by the manufacturer. The water insoluble solvent having a boiling point of greater than about 285° C. may be present in the inkjet ink composition in an amount ranging from about 0.1 wt % to about 1 wt % by total weight of the inkjet ink composition.

The solvent having a boiling point of greater than about 285° C. and/or being insoluble in water may be selected from the group consisting of esters (such as citrates, e.g. triethyl citrate, and 2,2,4-trimethyl-1,3-pentanediol monoisobutyrate), glycol esters, glycol ether-esters, glycol ethers, lactams, phosphate ethers, and combinations thereof. In some examples, solvent having a boiling point of greater than about 285° C. and/or being insoluble in water may be selected from the group consisting of esters containing 30 carbons or less; glycol esters, such as alkylene glycol esters containing 30 carbons or less; glycol ether-esters (such as triethylene glycol n-pentyl ether benzoate, triethylene glycol n-hexyl ether benzoate, tripropylene glycol n-butyl ether benzoate, tripropylene glycol n-pentyl ether benzoate, dipropylene glycol n-butyl ether benzoate, dipropylene glycol 2-ethylhexyl ether benzoate, and dipropylene glycol phenyl ether benzoate); glycol ethers (which may contain 30 carbons or less), such as glycol aryl ethers (e.g., alkylene glycol aryl ethers, glycol phenyl ethers, etc.) and glycol alkyl ethers (e.g. alkylene glycol alkyl ethers), lactams, and phosphate ethers.

In some examples, the solvent having a boiling point of greater than about 285° C. and/or being insoluble in water is selected from the group consisting of BENZOFLEX™ 2088 (high solvating plasticizer from Eastman Chemical Co., boiling point 356° C.), BENZOFLEX™ 50 (plasticizer from Eastman Chemical Co., boiling point 370° C.), BENZOFLEX™ LA-705 (plasticizer from Eastman Chemical Co., boiling point >350° C.), dibutyl sebacate (boiling point 344.5° C.), DOWANOL™ DiPPh (dipropylene glycol phenyl ether from The Dow Chemical Co., boiling point 280° C.), EASTMAN™ 168 (non-phthalate plasticizer from Eastman Chemical Co., boiling point 375° C.), EASTMAN™ EEH (ethylene glycol 2-ethylhexyl ether from Eastman Chemical Co., boiling point 226° C.), EASTMAN™ TXIB Formulation Additive (trimethyl pentanyl diisobutyrate) from Eastman Chemical Co., boiling point 281° C.), HEXAMOLL® DINCH® (1,2-cyclohexane dicarboxylic acid, 1,2-diisononyl ester from BASF Corp.), LOXANOL® CA 5310 (propylene glycol mono oleate from BASF Corp., boiling point 284° C.), LOXANOL® CA 5320 (propylene glycol monoester of C-18 fatty acids from BASF Corp.), OPTIFILM™ 300 ($C_{16}H_{30}O_4$ from Eastman Chemical Co., boiling point 281° C.), OPTIFILM™ 400 (triethylene glycol bis(2-ethylhexanoate) from Eastman Chemical Co., boiling point 374-381° C.), TEXANOL™ ester alcohol (2,2,4-trimethyl-1,3-pentanediol monoisobutyrate from Eastman Chemical Co., boiling point 255-261.5° C.), triethyl citrate (boiling point 294° C.), triethylene glycol bis(2-ethylhexanoate) (boiling point 344° C.), tris(2-butoxyethyl)phosphate (boiling point 200-230° C.), UCAR™ Filmer IBT (2,2,4-trimethyl-1,3-pentanediol monoisobutyrate from The Dow Chemical Co., boiling point 255° C.), VELATE™ 368 (2-ethylhexylbenzoate from Eastman Chemical Co., boiling point 297° C.), and N-(2-hydroxyethyl)-2-pyrollidinone (boiling point 140-142° C.).

In some examples, the inkjet ink composition includes at least about 0.05 wt % (by total weight of the inkjet ink composition) of the solvent having a boiling point of greater than about 285° C. and/or being insoluble in water. In some examples, the inkjet ink composition includes up to about 4 wt % (by total weight of the inkjet ink composition) of the solvent having a boiling point of greater than about 285° C. and/or being insoluble in water.

The ink vehicle may also include a variety of additional components suitable for inkjet ink compositions. These additional components may include surfactants (for example, suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like), buffers, biocides (such as NUOSEPT™ (Nudex Inc.), UCARCIDE™ (Union carbide Corp.), VANCIDE™ (R.T. Vanderbilt Co.), PROXEL™ (Lonza), and combinations thereof), viscosity modifiers, sequestering agents (such as EDTA (ethylene diamine tetraacetic acid) or TRILON® M (trisodium salt of methylglycinediacetic acid from BASF Corp.) or sodium salt of polyacrylic acid), stabilizing agents, wetting agents, antikogation agents (e.g., for thermal inkjet inks), and/or humectants. Some specific examples of suitable surfactants include water-soluble, non-ionic surfactants (e.g., TERGITOL™ TMN-6, TERGITOL™ 15S7, and TERGITOL™ 15S9 from The Dow Chemical Company), a non-ionic fluoro or silicone surfactant (e.g., CAPSTONE® fluorosurfactants from DuPont, previously known as ZONYL FSO, or BYK-348 from BYK-Chemie), and combinations thereof. Surfactants, when present, may be included in an amount ranging from about 0.01 wt % to about 10 wt % (by total weight of the inkjet ink composition), and the other additives may be present in a total amount ranging from 0 wt % to about 20 wt % (by total weight of the inkjet ink composition).

In some examples, the inkjet ink composition also includes the pigment dispersed in the ink vehicle. The term "pigment" may include particulate dispersible colorants that can be suspended or dispersed in the ink vehicle disclosed herein. The pigment itself can be a self-dispersed pigment or a non-self-dispersed pigment.

The pigment may include inorganic pigments or organic pigments of any desirable color, such as black pigments, white pigments, cyan pigments, magenta pigments, yellow pigments, or the like.

Suitable inorganic pigments include, for example, carbon black. However, other inorganic pigments may be suitable, such as titanium oxide, cobalt blue ($CoO$—$Al_2O_3$), chrome yellow ($PbCrO_4$), and iron oxide.

Suitable organic pigments include, for example, azo pigments including diazo pigments and monoazo pigments, polycyclic pigments (e.g., phthalocyanine pigments, such as phthalocyanine blues and phthalocyanine greens, perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Suitable examples of phthalocyanine blues include copper phthalocyanine blue and derivatives thereof (Pigment Blue 15). Suitable examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Suitable examples of anthraquinones include Pigment Red 43, Pigment Red 194 (Perinone Red), Pigment Red 216 (Brominated Pyranthrone Red) and Pigment Red 226 (Pyranthrone Red). Suitable examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Suitable examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF Corporation, Engelhard Corporation, and Sun Chemical Corporation.

Examples of black pigments that can be used include carbon pigments. The carbon pigment can be almost any commercially available carbon pigment that provides acceptable optical density and print characteristics. Examples of suitable carbon pigments include carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH™ 1400, MONARCH™ 1300, MONARCH™ 1100, MONARCH™ 1000, MONARCH™ 900, MONARCH™ 880, MONARCH™ 800, MONARCH™ 700, CAB-O-JET™ 200, CAB-O-JET™ 300, REGAL™, BLACK PEARLS, ELF- TEX™, MOGUL™, and VULCAN™ pigments; Columbian pigments such as RAVEN™ 7000, RAVEN™ 5750, RAVEN™ 5250, RAVEN™ 5000, and RAVEN™ 3500; Degussa pigments such as Color Black FW 200, RAVEN™ FW 2, RAVEN™ FW 2V, RAVEN™ FW 1, RAVEN™ FW 18, RAVEN™ S160, RAVEN™ FW S170, Special Black™ 6, Special Black™ 5, Special Black™ 4A, Special Black™ 4, PRINTEX™ U, PRINTEX™ 140U, PRINTEX™ V, and PRINTEX™140V.

Similarly, a wide variety of colored pigments can be used with the inkjet ink composition. While several examples follow, it is to be understood that the list is not intended to be limiting. For example, colored pigments can be blue, brown, cyan, green, white, violet, magenta, red, orange, yellow, as well as mixtures thereof. The following color dispersions are available from Cabot Corp. CABO-JET™ 250C, CABO-JET™ 260M, and CABO-JET™ 270Y. The following color pigments are available from BASF Corp.: PALIOGEN™ Orange, PALIOGEN™ Orange 3040, PALIOGEN™ Blue L 6470, PALIOGEN™ Violet 5100, PALIOGEN™ Violet 5890, PALIOGEN™ Yellow 1520, PALIOGEN™ Yellow 1560, PALIOGEN™ Red 3871K, PALIOGEN™ Red 3340, HELIOGEN™ Blue L 6901F, HELIOGEN™ Blue NBD 7010, HELIOGEN™ Blue K 7090, HELIOGEN™ Blue L 7101F, HELIOGEN™ Blue L6900, L7020, HELIOGEN™ Blue D6840, HELIOGEN™ Blue D7080, HELIOGEN™ Green L8730, HELIOGEN™ Green K 8683, and HELIOGEN™ Green L 9140. The following pigments are available from Ciba-Geigy Corp.: CHROMOPHTAL™ Yellow 3G, CHROMOPHTAL™ Yellow GR, CHROMOPHTAL™ Yellow 8G, IGRAZIN™ Yellow SGT, IGRALITE™ Rubine 4BL, IGRALITE™ Blue BCA, MONASTRAL™ Magenta, MONASTRAL™ Scarlet, MONASTRAL™ Violet R, MONASTRAL™ Red B, and MONASTRAL™ Violet Maroon B. The following pigments are available from Heubach Group: DALAMAR™ Yellow YT-858-D and HEUCOPHTHAL™ Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM™ Yellow HR, NOVOPERM™ Yellow FGL, Hansa Brilliant Yellow 10GX, Permanent Yellow G3R-01, HOSTAPERM™ Yellow H4G, HOSTAPERM™ Yellow H3G, HOSTAPERM™ Orange GR, HOSTAPERM™ Scarlet GO, HOSTAPERM™ Pink E, Permanent Rubine F6B, and the HOSTAFINE™ series. The following pigments are available from Mobay Corp.: QUINDO™ Magenta, INDOFAST™ Brilliant Scarlet, QUINDO™ Red R6700, QUINDO™ Red R6713, and INDOFAST™ Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, Lithol Fast Scarlet L4300, and white TIPURE R-101. These pigments are available from commercial sources such as Hoechst Celanese Corporation, Paul Uhlich, BASF Corp., American Hoechst, Novartis, Aldrich, DuPont, Ugine Kuhlman of Canada, Dominion Color Company, Magruder, and Matheson.

In some examples, the inkjet ink composition includes at least about 0.1 wt % pigment by total weight of the inkjet ink composition. In some examples, the inkjet ink composition includes up to about 30 wt % pigment by total weight of the inkjet ink composition. In some examples, the inkjet ink composition includes from about 0.1 wt % to about 30 wt %, or from about 0.3 wt % to about 15 wt % pigment by total weight of the inkjet ink composition. When the pigment is incorporated into the inkjet ink composition as part of a dispersion (e.g., which also includes water), it is to be understood that these percentages account for the weight percent of solid pigment particles or active pigment particles in the inkjet ink composition, and does not account for the total weight percent of the pigment dispersion that may be incorporated in the inkjet ink composition.

In other examples, the inkjet ink composition may be unpigmented or substantially lack a pigment. For example, the inkjet ink composition may include less than 0.5 wt % of a pigment. In some examples, the inkjet ink composition is unpigmented and lacks a pigment, for example the inkjet ink composition may be a colorless composition.

The inkjet ink composition also includes the polymer particles 10, 10', 10" disclosed herein. It is to be understood that any example of the polymer particles 10, 10', 10" may be included in the inkjet ink composition.

In an example, the polymer particles 10, 10', 10" included in the inkjet ink composition are selected so that i) in the first heteropolymer composition 12: the two or more aliphatic (meth)acrylate ester monomers are linear aliphatic (meth) acrylate ester monomers, cycloaliphatic (meth)acrylate ester monomers, or combinations thereof; or the two or more aliphatic (meth)acrylamide monomers are selected from the group consisting of C1 to C8 alkyl acrylamide monomers and C1 to C8 alkyl methacrylamide monomers; and ii) in the second heteropolymer composition 14: the cycloaliphatic monomer is selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof; and the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

In another example, the polymer particles 10, 10', 10" included in the inkjet ink composition are selected so that the first heteropolymer composition 12 is present in an amount ranging from about 15 wt % to about 70 wt % of a total weight of each of the polymer particles 10, 10', 10"; the second heteropolymer composition 14 is present in an amount ranging from about 30 wt % to about 85 wt % of a total weight of each of the polymer particles 10, 10', 10"; the $T_g$ of the first heteropolymer composition 12 ranges from about −25° C. to about 10° C.; and the $T_g$ of the second heteropolymer composition 14 ranges from about 60° C. to about 110° C.

The polymer particles 10, 10', 10" may be present in the inkjet ink composition in an amount ranging from about 5 wt % to about 35 wt % of a total weight of the inkjet ink composition. When the polymer particles 10, 10', 10" are incorporated into the inkjet ink composition as part of an aqueous emulsion (e.g., which also includes water), it is to be understood that these percentages account for the weight percent of solid polymer particles 10, 10', 10" or active polymer particles 10, 10', 10" in the inkjet ink composition, and does not account for the total weight percent of the aqueous emulsion that may be incorporated in the inkjet ink composition.

In some examples, the inkjet ink composition includes an amount of pigment and an amount of the polymer particles 10, 10', 10", such that the ratio of the amount of pigment to amount of polymer particles 10, 10', 10" by weight is in the range of about 0.1:15 to 10:5.

To form the inkjet ink composition, the ink vehicle or a portion of the ink vehicle may be introduced as the aqueous emulsion including the polymer particles 10, 10', 10" and the pigment dispersion are combined. In some examples, additional water or other main solvent may be added to the inkjet ink composition.

Figure 2:
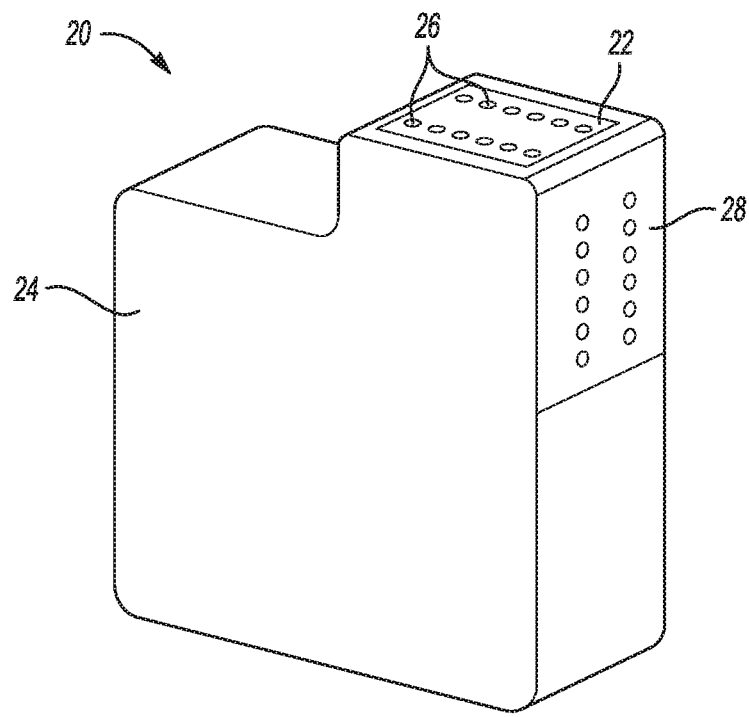
FIG. 2 is a perspective view of an example of an inkjet cartridge.

The inkjet ink composition may be dispensed from an ink cartridge. An example ink cartridge 20 is shown in FIG. 2. In an example, the ink cartridge 20 includes an ink reservoir 21; an inkjet ink composition (not shown) contained in the ink reservoir 21, the inkjet ink composition including: an ink vehicle including water and a co-solvent; a pigment dispersed in the ink vehicle; and polymer particles 10, 10', 10" dispersed in the ink vehicle, each of the polymer particles 10, 10', 10" including: a first heteropolymer composition 12 including two or more aliphatic (meth)acrylate ester monomers or two or more aliphatic (meth)acrylamide monomers; and a second heteropolymer composition 14 having a higher glass transition temperature ($T_g$) than a $T_g$ of the first heteropolymer composition, the second heteropolymer composition including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer; and an ink ejection device 22 in selective fluid communication with the ink reservoir 21.

It is to be understood that the inkjet ink composition contained within the ink reservoir 21 may be any of the examples of the inkjet ink composition disclosed herein.

The ink cartridge 20 may include a cartridge body 24 that contains an inkjet ink composition supply. The inkjet ink composition supply can include the ink reservoir 21 wholly contained within the cartridge body 14 or, alternatively, can include a chamber inside the cartridge body 24 that is fluidly coupled to one or more off-axis ink reservoirs (not shown).

The ink ejection device 22 may be mounted on an outer surface of the cartridge body 24 in fluid communication with the inkjet ink composition supply. The ink ejection device 22 selectively ejects drops of the inkjet ink composition through a nozzle 26, or a plurality of nozzles 26 formed therein. In some examples, the ink ejection device 22 is a thermal ink ejection device. The thermal ink ejection device may eject ink drops from a nozzle 26 by passing an electrical current through a heating element (as the firing element) to generate heat and vaporize a small portion of ink within the firing chamber. In other examples, the ink ejection device 22 is a piezoelectric ink ejection device. The piezoelectric ink ejection device may eject ink drops from a nozzle 26 using a piezoelectric actuator as the firing element.

The ink cartridge 20 may include electrical connectors 16 for transmitting signals to and from the ink ejection device 22. In some examples, the ink ejection device 22 is in communication with an electronic controller to control ink ejection from the ink ejection device 22.

The ink cartridge 20 including the ink ejection device 22 may be mounted in a carriage of an inkjet printer (not shown). The carriage may move the ink cartridge 20 across a print substrate in a print/image zone of the printer. The nozzles 26 associated with the ink ejection device 22 may be arranged in one or more linear nozzle arrays. The nozzles 26 may be aligned parallel to the direction in which the print substrate is moved through the printer and perpendicular to the direction of motion of the ink ejection device 22 with the ink cartridge 20. Control of the ejection of inkjet ink composition from each nozzle 26 causes characters, or other images, to be printed in a swath across the print substrate.

Alternatively, the ink cartridge 20 may be a page-wide print cartridge that is in fluid communication with an off-axis ink supply system. The page-wide ink cartridge 20 includes a print head bar that extends the entire print/image zone, and thus the page-wide ink cartridge 20 is static during a printing operation.

Also disclosed herein in a method of inkjet printing that utilizes the inkjet ink composition disclosed herein. The method of printing may include inkjet printing the inkjet ink composition as described herein onto a print substrate (e.g., a flexible non-porous print substrate or a rigid non-porous print substrate) to form an inkjet ink layer on the print substrate. The ink layer formed on the print substrate includes the inkjet ink composition, including the ink vehicle, the pigment, and the polymer particles 10, 10', 10".

In some examples, the method of printing further includes curing the polymer particles 10, 10', 10" in the ink layer on the print substrate. Curing of the polymer particles 10, 10', 10" forms a film of latex on the surface of the print substrate. The film of latex improves the durability, stretchability, color retention after stretching, and adhesion of the image printed using the inkjet ink composition.

In order for the polymer particles 10, 10', 10" to be cured, water may first be evaporated from the ink layer, and then any one or more of the co-solvents may be at least partially evaporated from the ink layer. Evaporation enables the polymer particles 10, 10', 10" to come into close contact with each other. Once the polymer particles 10, 10', 10" come into close contact (due to the at least partial evaporation of water and co-solvent(s)), the polymer particles 10, 10', 10" may coalesce by the intermingling of polymer chains between adjacent polymer particles 10, 10', 10" to cure the polymer particles 10, 10', 10" to from a latex polymer film. In order for the polymer particles 10, 10', 10" to be cured, the temperature of curing should be above the minimum film formation temperature (MFFT) of the applied ink layer. Pigment particles, where present, remain in the ink layer and are embedded within the latex polymer film upon curing of the polymer particles 10, 10', 10".

Water is evaporated from the printed inkjet ink composition before the co-solvent(s) are at least partially removed (evaporated) from the printed inkjet ink composition as water has a higher volatility (e.g., lower boiling point) than the co-solvent(s).

In examples where the ink vehicle includes the solvent having a boiling point ranging from about 170° C. to about 215° C. and the solvent having a boiling point ranging from about 220° C. to about 285° C., the solvent having the lower boiling point is evaporated, or at least partially evaporated, before the solvent having the higher boiling point, again due to the higher volatility of the solvent having the lower boiling point. The solvent having the higher boiling point remains in the ink layer after the water has been evaporated and the solvent with the lower boiling point has been at least partially evaporated.

In examples where the ink vehicle includes the solvent having a boiling point ranging from about 170° C. to about 215° C. and the solvent having a boiling point of greater than about 285° C., the solvent having the lower boiling point is evaporated, or at least partially evaporated, before the solvent having the higher boiling point, again due to the higher volatility of the solvent having the lower boiling point. The solvent having the higher boiling point remains in the ink layer after the water has been evaporated and the solvent with the lower boiling point has been at least partially evaporated.

The inclusion of the solvent having a boiling point of less than about 215° C. in the inkjet ink composition allows for fast drying of the inkjet ink composition to enable high throughput through a printing system. The presence of the higher boiling point solvent(s) in the inkjet ink composition, which remain in the ink layer after evaporation of the water and at least partial evaporation of the solvent having a boiling point of less than about 215° C., ensures that the MFFT of the ink layer remains lowered during the curing process.

In some examples, the curing the polymer particles 10, 10', 10" includes evaporating water from the ink layer. In other examples, the curing the polymer particles 10, 10', 10" includes evaporating water and at least a portion of the co-solvent(s) from the ink layer. Evaporation of water and at least a portion of the co-solvent(s) allows the polymer particles 10, 10', 10" within the ink layer to coalesce into a film (i.e., allows the particles 10, 10'. 10" cure). Evaporation may be facilitated in a printing system by providing heat and/or airflow. Heating may be conductive, radiative, or convective heating. Airflow may include parallel or impinging airflow. In some examples, heating the ink layer to evaporate water and at least a portion of the co-solvent(s) includes heating the ink layer to a temperature greater than the MFFT of the ink layer and such that the temperature of the print substrate is maintained below a temperature at which deformation (e.g., warping) of the print substrate occurs. For example, heating the ink layer may be accomplished such that the print substrate reaches a temperature of less than about 70° C., for example about 65° C. or less.

In some examples, curing the polymer particles 10, 10', 10" includes evaporating substantially all of the water from the ink layer, for example evaporating at least about 95 wt %, or at least about 99 wt %, or at least about 99.5 wt % of the water present in the inkjet ink composition printed as the ink layer. In some examples, curing the polymer particles 10, 10', 10" includes evaporating all of the water from the ink layer so that no water remains in the ink layer.

As previously mentioned, curing the polymer particles 10, 10', 10" may also involve evaporating at least a portion of the co-solvent(s). In an example, a major amount of the co-solvent(s) of the inkjet ink composition printed as the ink layer may be evaporated from the ink layer. In some examples, evaporating at least a portion of the co-solvent(s) includes evaporating at least about 80 wt %, or at least about 90 wt %, or at least about 99 wt % of the solvent having a boiling point ranging from about 170° C. to about 215° C. present in the inkjet ink composition printed as the ink layer.

In some examples, the solvent having a boiling point of about 220° C. or more is not evaporated from the ink layer during curing of the polymer particles 10, 10', 10". In some examples, at least a portion of the solvent having a boiling point of about 220° C. remains in the ink layer after curing of the latex polymer.

Figure 3:
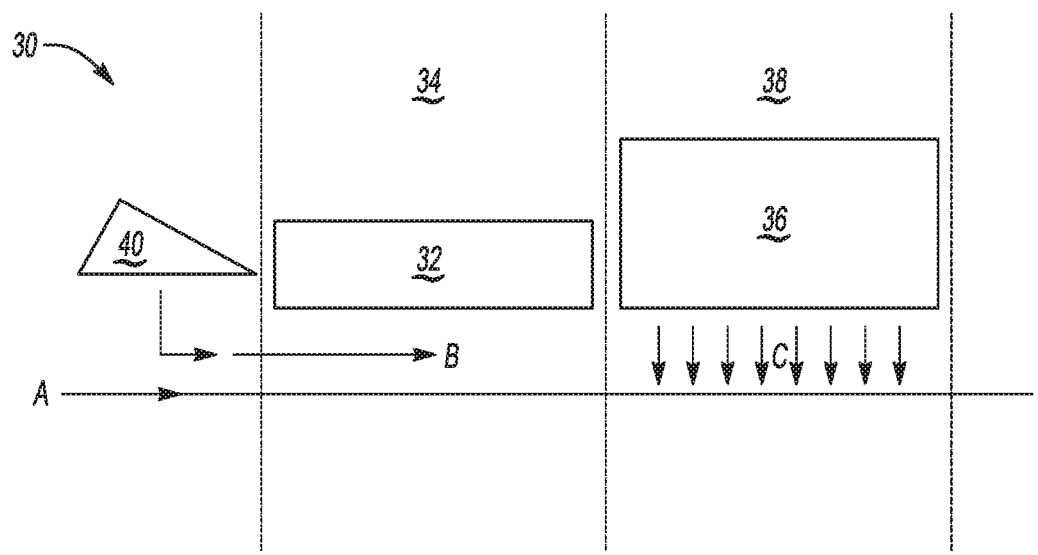
FIG. 3 is a schematic diagram of a printing system.

Referring now to FIG. 3, a schematic diagram of a printing system 30 including an inkjet printer 32 in a printing zone 34 of the printing system 30 and a drier 36 positioned in a curing zone 38 of the printing system 30. A print substrate may be transported through the printing system 30 along the path shown by arrow A such that the print substrate is first fed to the printing zone 34 where an example of the inkjet ink composition disclosed herein is inkjet printed onto the print substrate by the inkjet printer 32 (for example from an inkjet cartridge 20 as described above) to form an ink layer on the print substrate. The ink layer disposed on the print substrate may then be heated in the printing zone 34 (for example, the air temperature in the printing zone 34 may range from about 10° C. to about 90° C.) such that water may be evaporated from the ink layer. The print substrate (having the ink layer printed thereon) may then be transported to the curing zone 38 where the ink layer is heated (for example, the air temperature in the curing zone 38 may range from about 10° C. to about 140° C.) and air is blown onto the print substrate (as shown by arrows C) such that the solvent(s) are at least partially evaporated from the ink layer and the polymer particles 10, 10', 10" are heated to a temperature above the MFFT of the ink layer. In some examples, the printing system 30 also includes a fan 40 for blowing air over the print substrate passing through the printing zone 34 to evaporate water from the inkjet layer.

To further illustrate the present disclosure, an example is given herein. It is to be understood that this example is provided for illustrative purposes and is not to be construed as limiting the scope of the present disclosure

EXAMPLE

In this example, two comparative polymer particles were formed (i.e., comparative example 1 and comparative example 2), and two example polymer particles were formed in accordance with the examples disclosed herein (i.e., example 3 and example 4).

Comparative Example 1

The comparative polymer particles of comparative example 1 were formed with one stream of monomers.

The comparative polymer particles of comparative example 1 were prepared as follows. Deionized water (75.3 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Two streams were added to the reactor over 300 minutes. The first stream was an aqueous emulsion including water (30 g), copolymerizable surfactant (HITENOL® AR-1025) (10.6 g), cyclohexyl methacrylate (69.3 g), cyclohexyl acrylate (10.0 g), phenoxyethyl methacrylate (14.0 g), and methacrylic acid (4.0 g). The second stream was a solution of potassium persulfate (0.2 g) dissolved in water (10.0 g).

Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added.

The comparative polymer particles included a single hard polymer phase/composition of cyclohexyl methacrylate, cyclohexyl acrylate, phenoxyethyl methacrylate, and methacrylic acid. The comparative polymer particles were present in an emulsion (i.e., a latex emulsion), and made up 42.4% solids by total weight of the latex emulsion. The particle size of the comparative polymer particles was 0.215 µm (particle size determined using Microtrac Nanotrac Wave II), and the viscosity (at 25° C.) of the latex emulsion was less than 20 cps.

Comparative Example 2

The comparative polymer particles of comparative example 2 were formed with two different streams of monomers. One monomer streams included a solution of soft component monomers (with styrene as one of these soft component monomers), and the other monomer stream included an emulsion of several hard component monomers and an additional monomer.

The comparative polymer particles of comparative example 2 were prepared as follows. Deionized water (62.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including styrene (12.1 g), butyl acrylate (22.4 g), and methacrylic acid (0.54 g); (B) a solution of copolymerizable surfactant (HITENOL® AR-1025) (1.75 g) dissolved in water (5.0 g); and (C) a solution of potassium persulfate (0.2 g) dissolved in water (10.0 g). Streams (A) and (B) were added over 105 minutes. Stream (C) was initiated with steams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (HITENOL® AR-1025) (7.0 g), cyclohexyl methacrylate (45.1 g), cyclohexyl acrylate (6.5 g), phenoxyethyl methacrylate (9.1 g), and methacrylic acid (2.6 g).

Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added.

The resulting polymer particles included a two heteropolymer phases—one of styrene, butyl acrylate, and methacrylic acid and the other of cyclohexyl methacrylate, cyclohexyl acrylate, phenoxyethyl methacrylate, and methacrylic acid. The comparative polymer particles were present in an emulsion (i.e., a latex emulsion), and made up 42.4% solids by total weight of the latex emulsion. The particle size of the comparative polymer particles was 0.215 µm (particle size determined using Microtrac Nanotrac Wave II), and the viscosity (at 25° C.) of the latex emulsion was less than 20 cps.

Example 3

The example polymer particles of example 3 were formed with two different streams of monomers. One monomer streams included a solution of soft component monomers (i.e., monomers suitable for forming the first heteropolymer composition disclosed herein), and the other monomer stream included an emulsion of several hard and/or hydrophobic component monomers and an additional monomer (i.e., monomers suitable for forming the second heteropolymer composition disclosed herein).

The polymer particles of example 3 were prepared as follows. Deionized water (58.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including methyl methacrylate (12.1 g), butyl acrylate (22.4 g), and methacrylic acid (0.54 g); (B) a solution of copolymerizable surfactant (HITENOL® AR-1025) (1.75 g) dissolved in water (5.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (HITENOL® AR-1025) (7.0 g), cyclohexyl methacrylate (45.1 g), cyclohexyl acrylate (6.5 g), phenoxyethyl methacrylate (9.1 g), and methacrylic acid (2.6 g).

Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added.

The resulting polymer particles included a two heteropolymer phases—one of methyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.4% solids by total weight of the latex emulsion. The particle size of the example polymer particles was 0.215 µm (particle size determined using Microtrac Nanotrac Wave II), and the viscosity (at 25° C.) of the latex emulsion was less than 50 cps.

Example 4

The example polymer particles of example 4 were formed with two different streams of monomers. One monomer streams included a solution of soft component monomers (i.e., monomers suitable for forming the first heteropolymer composition disclosed herein), and the other monomer stream included an emulsion of several hard component monomers and an additional monomer (i.e., monomers suitable for forming the second heteropolymer composition disclosed herein).

The polymer particles of example 4 were prepared as follows. Deionized water (62.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including butyl methacrylate (20.6 g), butyl acrylate (13.8 g), and methacrylic acid (0.54 g); (B) a solution of copolymerizable surfactant (HITENOL® AR-1025) (2.24 g) dissolved in water (10.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (HITENOL® AR-1025) (7.0 g), cyclohexyl methacrylate (45.1 g), cyclohexyl acrylate (6.5 g), phenoxyethyl methacrylate (9.1 g), and methacrylic acid (2.6 g).

Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added.

The resulting polymer particles included a two heteropolymer phases—one of butyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.5% solids by total weight of the latex emulsion. The particle size of the example polymer particles was 0.222 μm (particle size determined using Microtrac Nanotrac Wave II), and the viscosity (at 25° C.) of the latex emulsion was less than 20 cps.

Inkjet Ink Compositions with Polymer Particles of Comparative Examples 1 and 2 and Examples 3 and 4

Respective comparative inkjet inks were formed (i.e., comparative ink A and comparative ink B) with the comparative polymer particles of comparative examples 1 and 2, and respective example inkjet inks were formed (i.e., example ink C and example ink D) with the example polymer particles of examples 3 and 4. The formulations of the comparative and example inkjet inks are shown in Table 3. Each number represents the wt % of each component present in the example and comparative ink compositions (with respect to the total weight of the respective ink composition). The wt % of the pigment represents the percentage of the solid pigment particles.

TABLE 3

| Ingredient | Specific Component | Comp. Ink A | Comp. Ink B | Ex. Ink C | Ex. Ink D |
|---|---|---|---|---|---|
| Co-solvent (170° C. ≤ BP ≤ 215° C.) | 1,2-Butanediol | 18 | 18 | 18 | 18 |
| Co-solvent (220° C. ≤ BP ≤ 285° C.) | 2-Pyrrolidinone | 3 | 3 | 3 | 3 |
| | DOWANOL ™ TPM | 2 | 2 | 2 | 2 |
| Anti-kogation agent | CRODAFOS ® O3A | 0.5 | 0.5 | 0.5 | 0.5 |
| Surfactants | TERGITOL ® 15-S-7 | 0.2 | 0.2 | 0.2 | 0.2 |
| | CAPSTONE ® FS-35 | 0.4 | 0.4 | 0.4 | 0.4 |
| Pigment | Black Pigment Dispersion | 2.6 | 2.6 | 2.6 | 2.6 |
| Polymer Particles (PP) | PP from Comp. Ex. 1 | 10 | 0 | 0 | 0 |
| | PP from Comp. Ex. 2 | 0 | 10 | 0 | 0 |
| | PP from Example 3 | 0 | 0 | 10 | 0 |
| | PP from Example 4 | 0 | 0 | 0 | 10 |
| Water | Deionized water | Balance | Balance | Balance | Balance |

Comparative inks A and B and Example inks C and D were printed on flexible media (self-adhesive vinyl (SAV) and polyethylene terephthalate (PET)) and rigid media (polypropylene), and the different prints were exposed to several different tests.

Color Retention on SAV Flexible Media

Comparative inks A and B and Example inks C and D were thermal inkjet printed on 3M IJ180c Controltac cast SAV, cured, and dried. The printed samples were 150 mm×20 mm color swatches.

The printed samples were stretched on an Instron tester at 300 mm/minute. For this test, the backing of the media was removed, and all tests were run at ambient temperature. The printed samples were run at 0%, 15%, 30%, 60% and 90% elongation. For example, at 90% elongation, the printed sample was elongated from 150 mm to 285 mm. L*a*b* was measured at 5 locations along each printed sample both before and after elongation. The change in color (ΔE from Lab measurements relative to the unstretched sample) was then plotted versus Media Elongation Percentage (see Table 4).

TABLE 4

| | Media Elongation, % | | | | |
|---|---|---|---|---|---|
| Ink ID | 0% | 15% | 30% | 60% | 90% |
| Comp. Ex. Ink A | 0 | 1.2 | 3.6 | 18.4 | 26.1 |
| Comp. Ex. Ink B | 0 | 0.9 | 2.1 | 3.5 | 4.2 |
| Ex. Ink C | 0 | 0.1 | 1.5 | 2.7 | 4.4 |
| Ex. Ink D | 0 | 0.8 | 2.4 | 5.5 | 7.5 |

Low color change (ΔE less than 2 units at 50% elongation) is highly desirable. Inks C and D formed with polymer particles from examples 3 and 4 (i.e., the polymer particles included a mixture of hard and soft polymer compositions) outperformed comparative ink A formed with polymer particles from comparative example 1 (i.e., the polymer particles included a single hard polymer phase) in terms of color retention on flexible media after elongation.

Cross Hatch Tape Adhesion on Polypropylene Rigid Media

Comparative inks A and B and Example inks C and D were thermal inkjet printed on rigid, fluted polypropylene (i.e., IntePro® Fluted Polypropylene, cured and dried.

The printed samples were tested for adhesion. A cross hatch tape adhesion test was carried out as defined in AS™ D3359 09, except that Intertape Polymer Group™ 515965 tape was used in place of Permacel™ P99 test tape. The numbers 0-5 provided in Table 5 refer to the amount of printed ink that was removed from each of the samples following this test according to Scale 1.

| Scale 1 | |
|---|---|
| Grade | Printed Ink Removal |
| 0 | 0% removed |
| 1 | <5% removal |
| 2 | 5-15% removal |
| 3 | 15-35% removal |
| 4 | 35-65% removal |
| 5 | >65% removal |

TABLE 5

| Ink ID | Tape Adhesion |
|---|---|
| Comp. Ex. Ink A | 0 |
| Comp. Ex. Ink B | 3 |
| Ex. Ink C | 0 |
| Ex. Ink D | 0 |

As shown in Table 5, inks C and D formed with polymer particles from examples 3 and 4 (i.e., the polymer particles included a mixture of hard and soft polymer compositions) outperformed Ink B formed with polymer particles from comparative example 2 (i.e., the polymer particles included a soft polymer composition including styrene) in terms of adhesion to rigid media.

Resistance to Flaking on PET Flexible Media

Comparative inks A and B and Example inks C and D were thermal inkjet printed on several different types of PET (polyethylene terephthalate) flexible media, namely DIALUX SIGUV 1370/60 and LINTEC 2201. As previously mentioned herein, ink flaking may be observed when a polymer-containing ink is applied over a flexible non-porous media. Ink flaking was tested by manually distorting a V-shaped groove or a flat crease (kink) into the media and looking for visual signs of ink failure. The numbers 0-5 provided in Table 6 refer to the flaking score according to Scale 2.

| Scale 2 | |
|---|---|
| Grade | Ink Flaking |
| 0 | Media deformation is the only evidence of kink (excellent) |
| 1 | There is a texture or slice mark after kink, but no ink flake |
| 2 | Narrow ink flake path following kink |
| 3 | Medium ink flake path following kink |
| 4 | Large ink flake path following kink |
| 5 | Very large ink flakes come off, like finger-nail size (very poor) |

TABLE 6

| | Flaking Resistance | |
|---|---|---|
| Ink ID | SIGUV 1370/60 | Lintec 2201 |
| Comp. Ex. Ink A | 4 | 4 |
| Comp. Ex. Ink B | 3 | 5 |
| Ex. Ink C | 0 | 0 |
| Ex. Ink D | 2.5 | 2 |

As shown in Table 6, inks C and D formed with polymer particles from examples 3 and 4 (i.e., the polymer particles included a mixture of hard and soft polymer compositions) outperformed both comparative inks A and B in terms of ink flaking off of flexible media.

The results of this example illustrate that overall the example inks formed with the polymer particles having the dual heteropolymers compositions disclosed herein performed better on flexible media and rigid media than a comparative ink including a single polymer composition and/or a comparative ink including styrene as part of the soft component of a dual heteropolymers composition.

It is to be understood that the ranges provided herein include the stated range and any value or sub-range within the stated range. For example, a range from about −25° C. to about 10° C. should be interpreted to include not only the explicitly recited limits of from about −25° C. to about 10° C., but also to include individual values, such as −16° C., 0.3° C., 7° C., etc., and sub-ranges, such as from about −20° C. to about 5° C., from about −23.5° C. to about 3.5° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A polymer particle, comprising:
    a first heteropolymer composition including butyl acrylate and methyl methacrylate as two aliphatic (meth)acrylate ester monomers, and further including methacrylic acid;
    a second heteropolymer composition having a higher glass transition temperature ($T_g$) than a $T_g$ of the first heteropolymer composition, the second heteropolymer composition including cyclohexyl methacrylate and cyclohexyl acrylate as cycloaliphatic monomers, 2-phenoxyethyl methacrylate as an aromatic monomer, and methacrylic acid as an additional monomer;
    wherein:
    the $T_g$ of the first heteropolymer composition ranges from about −8° C. to about −9° C.;
    the $T_g$ of the second heteropolymer composition ranges from about 85° C. to about 88° C.; and the polymer particle includes about 35 wt % of the first heteropolymer composition and about 65 wt % of the second heteropolymer composition.

2. The polymer particle as defined in claim 1 wherein the first heteropolymer composition is physically separated from the second heteropolymer composition within the polymer particle.

3. The polymer particle as defined in claim 1 wherein the polymer particle includes no more than 5% styrene.

4. A polymer particle, comprising:
a first heteropolymer composition consisting of two or more aliphatic (meth)acrylate ester monomers or two or more aliphatic (meth)acrylamide monomers, a first polymerizable surfactant, and methacrylic acid; and
a second heteropolymer composition having a higher glass transition temperature ($T_g$) than a $T_g$ of the first heteropolymer composition, the second heteropolymer composition consisting of a cycloaliphatic monomer, an aromatic monomer, a second polymerizable surfactant, and an additional monomer selected from the group consisting of an unsaturated acid functional acrylate derivative, butyl acrylate, butyl methacrylate, and methyl methacrylate, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer.

5. The polymer particle as defined in claim 4 wherein:
the first heteropolymer composition is present in an amount ranging from about 15 wt % to about 70 wt % of a total weight of the polymer particle; and
the second heteropolymer composition is present in an amount ranging from about 30 wt % to about 85 wt % of a total weight of the polymer particle.

6. The polymer particle as defined in claim 4 wherein:
the $T_g$ of the first heteropolymer composition ranges from about −25° C. to about 10° C.;
the $T_g$ of the second heteropolymer composition ranges from about 60° C. to about 110° C.; and
a $T_g$ of the polymer particle ranges from about 25° C. to about 65° C.

7. The polymer particle as defined in claim 4 wherein:
the two or more aliphatic (meth)acrylate ester monomers are linear aliphatic (meth)acrylate ester monomers, cycloaliphatic (meth)acrylate ester monomers, or combinations thereof; or
the two or more aliphatic (meth)acrylamide monomers are selected from the group consisting of C1 to C8 alkyl acrylamide monomers and C1 to C8 alkyl methacrylamide monomers.

8. The polymer particle as defined in claim 4 wherein:
the cycloaliphatic monomer is selected from the group consisting of cyclohexyl acrylate, cyclohexyl methacrylate, methylcyclohexyl acrylate, methylcyclohexyl methacrylate, trim ethylcyclohexyl acrylate, tri methylcyclohexyl methacrylate, tert-butylcyclohexyl acrylate, tert-butylcyclohexyl methacrylate, and combinations thereof; and
the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

9. An inkjet ink composition, comprising:
an ink vehicle including water and a co-solvent;
a pigment dispersed in the ink vehicle; and
polymer particles dispersed in the ink vehicle, each of the polymer particles including:
a first heteropolymer composition including butyl acrylate and methyl methacrylate as two aliphatic (meth)acrylate ester monomers, and further including methacrylic acid;
a second heteropolymer composition having a higher glass transition temperature ($T_a$) than a $T_g$ of the first heteropolymer composition, the second heteropolymer composition including cyclohexyl methacrylate and cyclohexyl acrylate as cycloaliphatic monomers, 2-phenoxyethyl methacrylate as an aromatic monomer, and methacrylic acid as an additional monomer;
wherein:
the $T_g$ of the first heteropolymer composition ranges from about −8° C. to about −9° C.;
the $T_g$ of the second heteropolymer composition ranges from about 85° C. to about 88° C.; and
the polymer particle includes about 35 wt % of the first heteropolymer composition and about 65 wt % of the second heteropolymer composition.

10. The inkjet ink composition as defined in claim 9 wherein the polymer particles are present in an amount ranging from about 5 wt % to about 35 wt % of a total weight of the inkjet ink composition.

11. An ink cartridge, comprising:
an ink reservoir;
an inkjet ink composition contained in the ink reservoir, the inkjet ink composition including:
an ink vehicle including water and a co-solvent;
a pigment dispersed in the ink vehicle; and
the polymer particles of claim 1 dispersed in the ink vehicle; and
an ink ejection device in selective fluid communication with the ink reservoir.

\* \* \* \* \*